United States Patent
Hung et al.

[11] Patent Number: 5,111,454
[45] Date of Patent: May 5, 1992

[54] DIGITAL CELLULAR TDM SYSTEM EMPLOYING 6:1 PACKING OF TRANSCODED INFORMATION

[75] Inventors: Nelson C. Hung, Schaumburg; John R. Welk, Addison, both of Ill.

[73] Assignee: Motorola, Inc., Schaumburg, Ill.

[21] Appl. No.: 567,994

[22] Filed: Aug. 16, 1990

[51] Int. Cl.$^5$ .............................................. H04J 3/16
[52] U.S. Cl. ..................... 370/95.3; 370/109; 455/72
[58] Field of Search ............................. 370/95.3, 109

[56] References Cited

U.S. PATENT DOCUMENTS

| | | | |
|---|---|---|---|
| 4,204,093 | 5/1980 | Yeh | 370/95.3 |
| 4,332,026 | 5/1982 | Alvarez | 370/95.3 |
| 4,759,016 | 7/1988 | Otsuke | 370/95.3 |
| 4,817,089 | 3/1989 | Taneth et al. | 370/95.1 |
| 4,930,126 | 5/1990 | Kazecki et al. | |

OTHER PUBLICATIONS

AT&T Technical Reference, "M44 Multiplexing A Service Function of ACCUNET T1.5," Sep. 1986.

AT&T Technical Reference, "Proposed Variable Rate ADPCM Algorithm and Line Format," Feb. 4, 1985.

Primary Examiner—Douglas W. Olms
Assistant Examiner—T. Samuel
Attorney, Agent, or Firm—Raymond A. Jenski; Anthony J. Salri; Rolland R. Hackbart

[57] ABSTRACT

A digital cellular time-division multiple access (TDMA) system including a cellular switch and at least one base site employing 6:1 packing of transcoded information. The system incorporates the VSELP speech encoding algorithm to transcode data input from a cellular switch and a unique packing scheme to compress six messages channels worth of transcoded data into one 20 msec, 160 frame information block for transmission in one TDM timeslot. The compressed transcoded data is transmitted to a base-site on a T1 link where the six message channels worth of transcoded data is unpacked and coded. The coded information is then separated into two groups of three air-interface timeslots where two separate transmitters transmit one group each of three air-interface timeslots on two separate radio carrier frequencies.

40 Claims, 6 Drawing Sheets

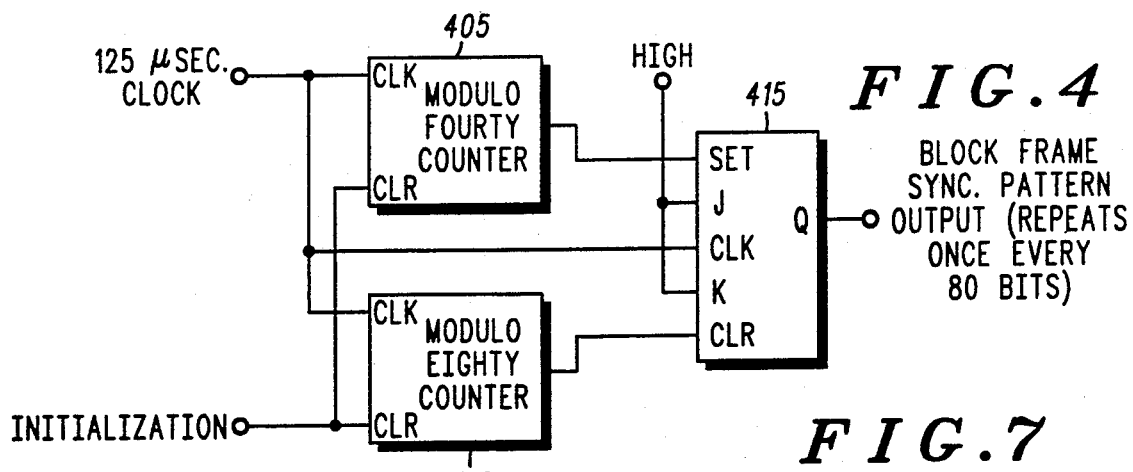
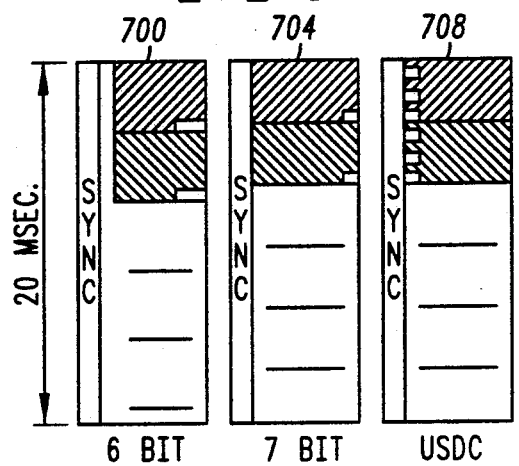
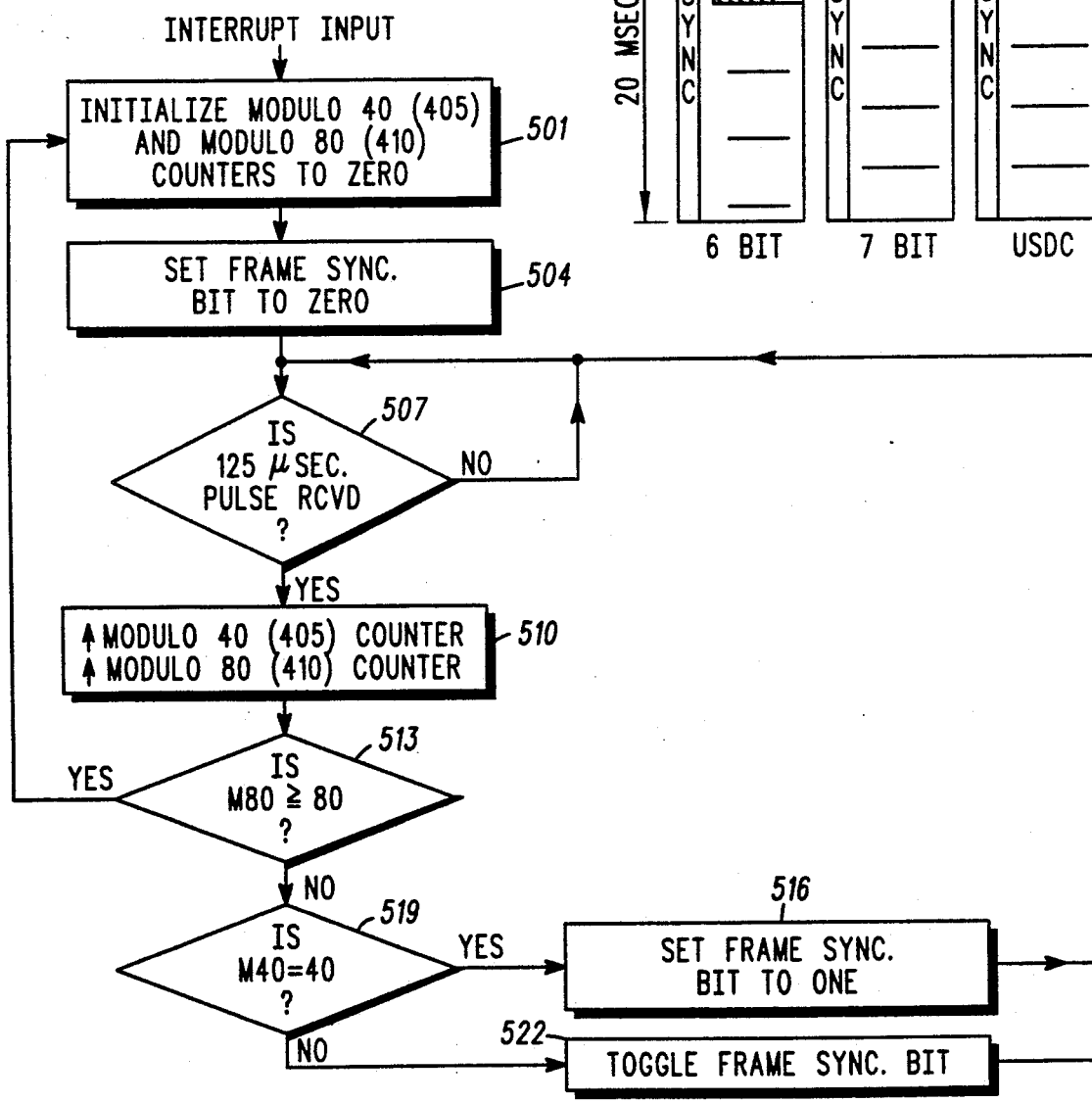

FIG. 6A

FRAME 1 → FRAME 40 (SYNC BIT):

| Sync | X | Content |
|---|---|---|
| 0 | X | HEADER |
| 1 | | A0–A6 |
| 0 | X | A7–A12 |
| 1 | | A13–A19 |
| 0 | X | A20–A25 |
| 1 | | A26–A32 |
| 0 | X | A33–A38 |
| 1 | | A39–A45 |
| 0 | X | A46–A51 |
| 1 | | A52–A58 |
| 0 | X | A59–A64 |
| 1 | | A65–A71 |
| 0 | X | A72–A77 |
| 1 | | A78–A84 |
| 0 | X | A85–A90 |
| 1 | | A91–A97 |
| 0 | X | A98–A103 |
| 1 | | A104–A110 |
| 0 | X | A111–A116 |
| 1 | | A117–A123 |
| 0 | X | A124–A129 |
| 1 | | A130–A136 |
| 0 | X | A137–A142 |
| 1 | | A143–A149 |
| 0 | X | A150–A155 |
| 1 | | A156–A159 & 3 SP |
| 0 | X | CRC-6(CHANNEL A) |
| 1 | | B0–B6 |
| 0 | X | B7–B12 |
| 1 | | B13–B19 |
| 0 | X | B20–B25 |
| 1 | | B26–B32 |
| 0 | X | B33–B38 |
| 1 | | B39–B45 |
| 0 | X | B46–B51 |
| 1 | | B52–B58 |
| 0 | X | B59–B64 |
| 1 | | B65–B71 |
| 0 | X | B72–B77 |
| 1 | | B78–B84 |

HEADER → BEGINNING OF NEW 160 FRAME INFORMATION BLOCK

FRAME 41 → FRAME 80:

| Sync | X | Content |
|---|---|---|
| 1 | | B85–B91 |
| 0 | X | B92–B97 |
| 1 | | B98–B104 |
| 0 | X | B105–B110 |
| 1 | | B111–B117 |
| 0 | X | B118–B123 |
| 1 | | B124–B130 |
| 0 | X | B131–B136 |
| 1 | | B137–B143 |
| 0 | X | B144–B149 |
| 1 | | B150–B156 |
| 0 | X | B157–B159 & 3 SP |
| 1 | | CRC-6(CHANNEL B) |
| 0 | X | C0–C5 |
| 1 | | C6–C12 |
| 0 | X | C13–C18 |
| 1 | | C19–C25 |
| 0 | X | C26–C31 |
| 1 | | C32–C38 |
| 0 | X | C39–C44 |
| 1 | | C45–C51 |
| 0 | X | C52–C57 |
| 1 | | C58–C64 |
| 0 | X | C65–C70 |
| 1 | | C71–C77 |
| 0 | X | C78–C83 |
| 1 | | C84–C90 |
| 0 | X | C91–C96 |
| 1 | | C97–C103 |
| 0 | X | C104–C109 |
| 1 | | C110–C116 |
| 0 | X | C117–C122 |
| 1 | | C123–C129 |
| 0 | X | C130–C135 |
| 1 | | C136–C142 |
| 0 | X | C143–C148 |
| 1 | | C149–C155 |
| 0 | X | C156–C159 & 2 SP |
| 1 | | CRC-6(CHANNEL C) |
| 0 | X | PARITY |

FRAME 81:
| 0 | X | HEADER |
| 1 | | D0-D6 |
| 0 | X | D7-D12 |
| 1 | | D13-D19 |
| 0 | X | D20-D25 |
| 1 | | D26-D32 |
| 0 | X | D33-D38 |
| 1 | | D39-D45 |
| 0 | X | D46-D51 |
| 1 | | D52-D58 |
| 0 | X | D59-D64 |
| 1 | | D65-D71 |
| 0 | X | D72-D77 |
| 1 | | D78-D84 |
| 0 | X | D85-D90 |
| 1 | | D91-D97 |
| 0 | X | D98-D103 |
| 1 | | D104-110 |
| 0 | X | D111-D116 |
| 1 | | D117-D123 |
| 0 | X | D124-D129 |
| 1 | | D130-D136 |
| 0 | X | D137-D142 |
| 1 | | D143-D149 |
| 0 | X | D150-D155 |
| 1 | | D156-D159 & 3 SP |
| 0 | X | CRC-6(CHANNEL D) |
| 1 | | E0-E6 |
| 0 | X | E7-E12 |
| 1 | | E13-E19 |
| 0 | X | E20-E25 |
| 1 | | E26-E32 |
| 0 | X | E33-E38 |
| 1 | | E39-E45 |
| 0 | X | E46-E51 |
| 1 | | E52-E58 |
| 0 | X | E59-E64 |
| 1 | | E65-E71 |
| 0 | X | E72-E77 |

FRAME 120:
| 1 | | E78-E84 |

FRAME 121:
| 1 | | E85-E91 |
| 0 | X | E92-E97 |
| 1 | | E98-E104 |
| 0 | X | E105-E110 |
| 1 | | E111-E117 |
| 0 | X | E118-E123 |
| 1 | | E124-E130 |
| 0 | X | E131-E136 |
| 1 | | E137-E143 |
| 0 | X | E144-E149 |
| 1 | | E150-E156 |
| 0 | X | E157-E159 & 3 SP |
| 1 | | CRC-6(CHANNEL E) |
| 0 | X | F0-F5 |
| 1 | | F6-F12 |
| 0 | X | F13-F18 |
| 1 | | F19-F25 |
| 0 | X | F26-F31 |
| 1 | | F32-F38 |
| 0 | X | F39-F44 |
| 1 | | F45-F51 |
| 0 | X | F52-F57 |
| 1 | | F58-F64 |
| 0 | X | F65-F70 |
| 1 | | F71-F77 |
| 0 | X | F78-F83 |
| 1 | | F84-F90 |
| 0 | X | F91-F96 |
| 1 | | F97-F103 |
| 0 | X | F104-F109 |
| 1 | | F110-F116 |
| 0 | X | F117-F122 |
| 1 | | F123-F129 |
| 0 | X | F130-F135 |
| 1 | | F136-F142 |
| 0 | X | F143-F148 |
| 1 | | F149-F155 |

FRAME 160:
| 0 | X | F156-F159 & 2 SP |
| 1 | | CRC-6(CHANNEL F) |
| 0 | X | PARITY |

END OF 160 FRAME INFORMATION BLOCK

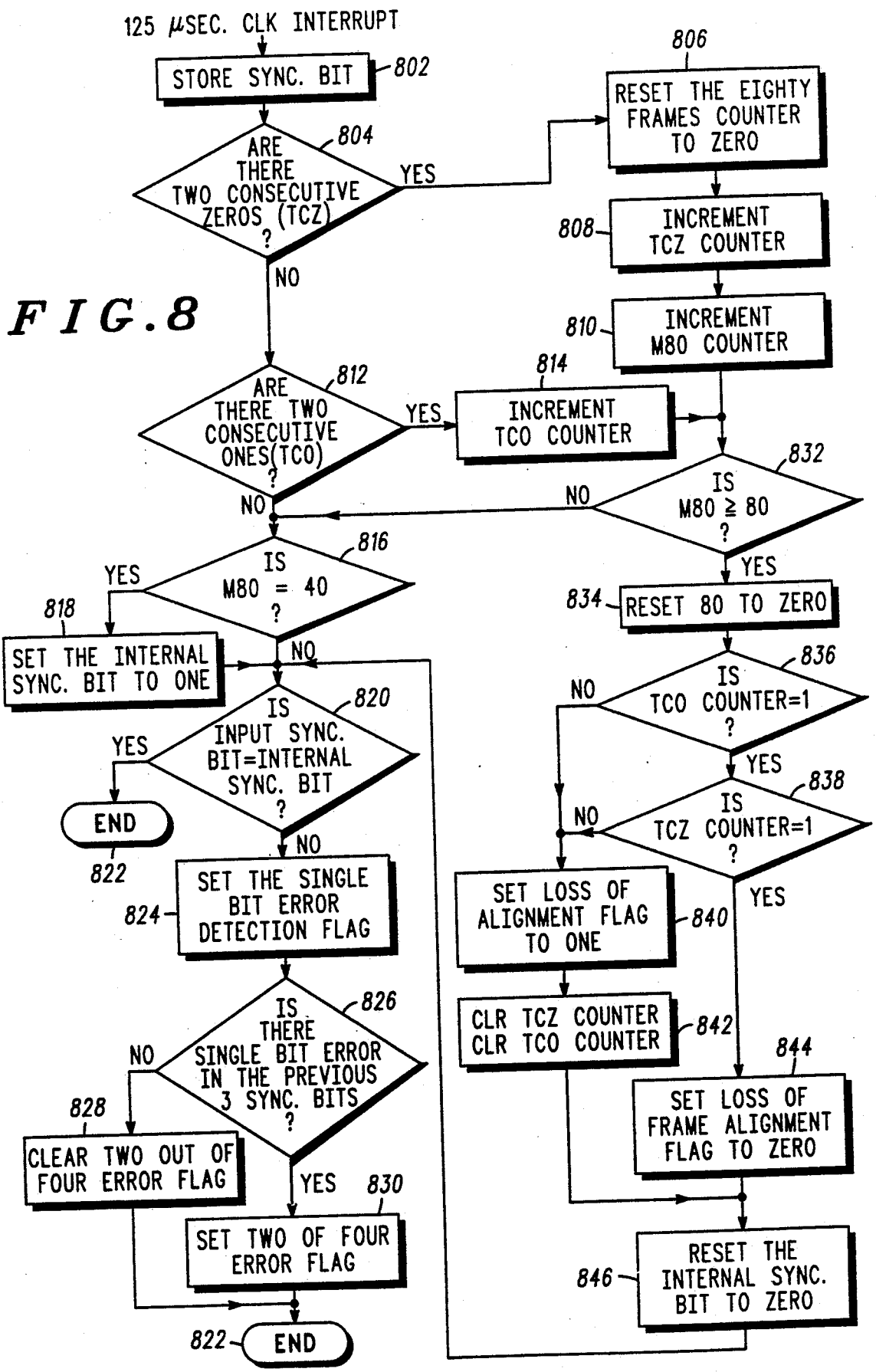

5,111,454

DIGITAL CELLULAR TDM SYSTEM EMPLOYING 6:1 PACKING OF TRANSCODED INFORMATION

TECHNICAL FIELD OF THE INVENTION

The invention relates generally to radio frequency (RF) communication systems and more particularly to RF digital cellular systems incorporating time-division multiplexing (TDM) for data transmission.

BACKGROUND OF THE INVENTION

RF digital cellular systems employing time-division multiple access (TDMA) carriers offer distinct advantages over analog cellular systems in both system capacity and electrical performance. In a TDMA system, two or more channels of information are transmitted over the same link by allocating a different time interval for the transmission of each channel. For RF digital cellular systems, each time interval (message channel) contains coded speech (or data) for one traffic channel (or voice channel). Such a system using this TDMA format is the United States Digital Cellular System (USDC) defined in EIA/TIA, Project Number 2215 titled "Dual-Mode Mobile Station—Base Station Compatibility Standard" dated December 1989. The system uses the TDMA format for communication between land-based equipment as well as land-based to mobile communication.

Common to all RF digital cellular systems is transcoding which essentially transforms high bit-rate speech data into high quality synthesized speech at low bit-rates. Transcoding in the USDC system is performed on 20 msec blocks of speech and yields an 8:1 compression of speech data. Since the transcoded speech data is transmitted to base-sites in 20 msec blocks, approximately ⅞ of the allotted block is wasted.

One way to more efficiently use this wasted space would be to pack the transcoded data for more than one message channel into a 20 msec block. In packing the 20 msec block, several problems are encountered. First, the packing scheme needs to support the synchronization scheme of the base-sites which uses the eighth bit of every message channel byte in an alternating zero and one pattern. Second, the packing scheme needs to support bit seven (B7) stuffing which leaves the seventh bit of every message channel byte having a zero synchronization bit un-used. This is required by some land-based radiotelephone equipment to retain synchronization in the case where a message channel contains all zeros. A final consideration is that packing six traffic channels into one 20 msec block would lend itself well to the base-sites air-interface transmission scheme.

FIG. 7 depicts the various packing schemes attempted. The first attempt was to use bits one through six (6-bit packing) of each message channel byte (700). This scheme supported B7 stuffing, but only five traffic channels could be packed. Another attempt used bits one through seven (7-bit packing) of each message channel byte (704) and although six traffic channels could be packed, the scheme did not support B7 stuffing.

Accordingly, there exists a need for a RF digital cellular TDMA system that provides efficient packing of traffic channels after transcoding while supporting standard radiotelephone synchronization requirements.

SUMMARY OF THE INVENTION

A digital radio time-division multiple access (TDMA) system including a land-line telephone system interface and at least one base-site which generates at least one radio carrier frequency compresses information input from at least two message channels from the land-line telephone system into one information block for transmission in one TDM timeslot. The system inserts synchronization into the information block and conveys at least said one TDM timeslot from the land-line telephone system interface to a base site. The compressed information of said one TDM timeslot is converted to coded information for at least two information timeslots for radio transmission on a radio carrier frequency.

BRIEF DESCRIPTION OF THE DRAWINGS

FIG. 4 illustrates a portion of the circuitry located in the land-line telephone system interface used to generate and insert the synchronization pattern described.

FIG. 5 is a flow diagram illustrating the steps the land-line telephone system interface performs to generate and insert the synchronization pattern described.

FIGS. 6A and 6B depict the resulting 160 frame information block after packing six 160 bit groups, adding error control, synchronization, header and parity information.

FIG. 7 depicts various packing methods.

FIG. 8 is a flow diagram illustrating the steps a base-site performs to remove synchronization from the 160 frame information block and check each 160 bit group for transmission errors.

DETAILED DESCRIPTION OF THE PREFERRED EMBODIMENT

Figure 1:
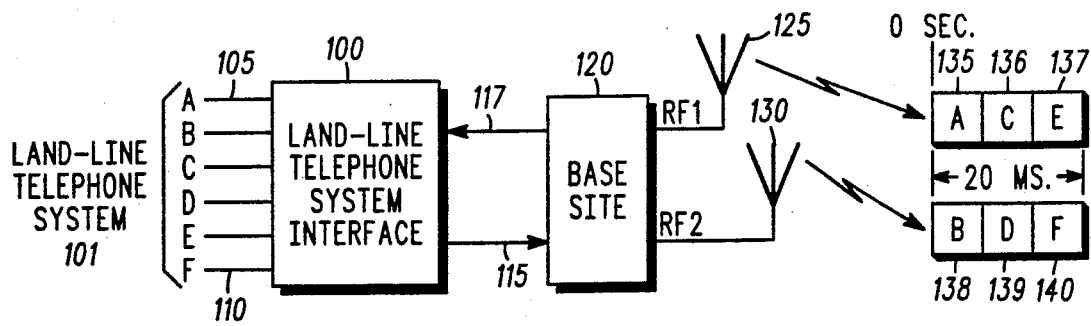
FIG. 1 generally depicts one embodiment implementing 6:1 packing of message channels into one TDM timeslot in accordance with the invention.

FIG. 1 illustrates 6:1 compression of message channels in accordance with the invention.

Figure 2:
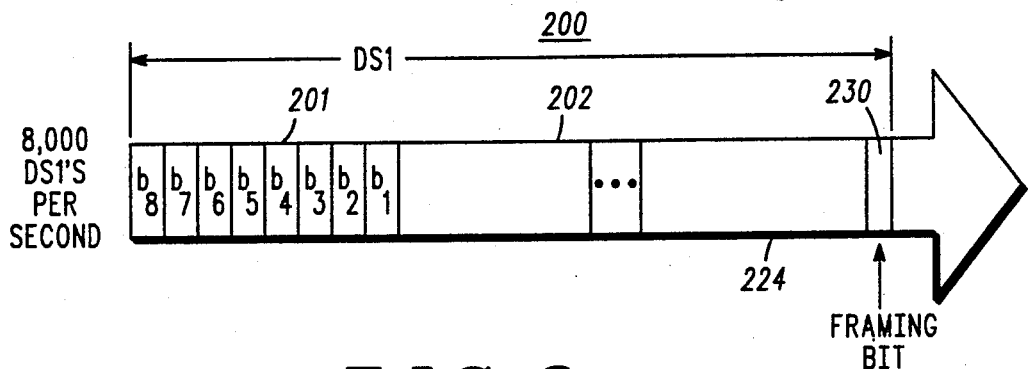
FIG. 2 illustrates the framing format of the T1 links used to communicate between land-based equipment.

A land-line telephone system interface (100) has as input information carried on six separate T1 links (105-110) connected to a land-line telephone system (101). FIG. 2 illustrates the framing format for a T1 link. Each DS1 (200) is comprised of 24 message channels (201-224) and one framing bit (230). Each message channel represents data for one "conversation" and is comprised of 8 bits b1-b8 where bit b1 is the least significant bit and bit b8 is the most significant bit. The bit rate per message channel is 64 Kbit/s.

Figure 3:
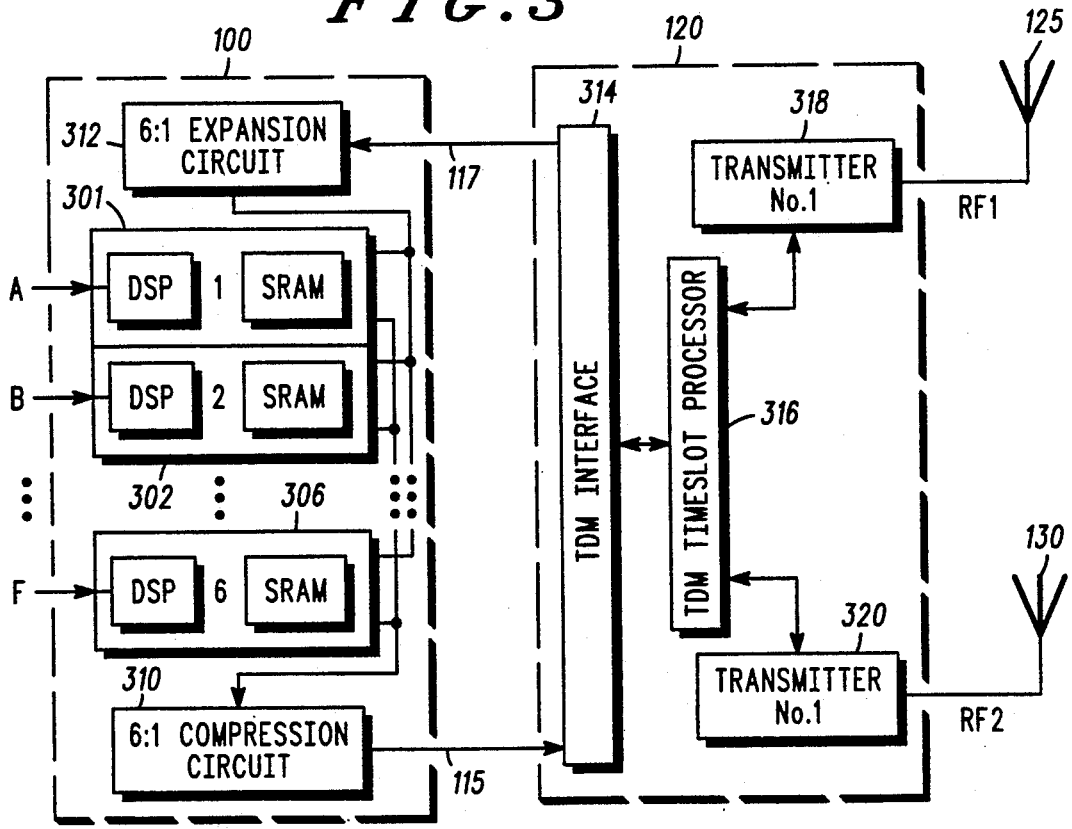
FIG. 3 illustrates in detail 6:1 packing of message channels into one TDM timeslot in accordance with the invention.

The land-line telephone system interface (100) of FIG. 1 contains the VSELP speech encoding algorithm (U.S. Pat. No. 4,817,157). Referring to FIG. 3, the VSELP speech encoding algorithm resides in six separate 32K×24 static random access memory (SRAM) devices while the algorithm runs on six separate Motorola 56001 digital signal processors (DSP's). The combination of SRAM's and DSP's form six separate processing blocks (301-306). The function of the VSELP speech encoding algorithm is two-fold. First, it obtains 160, 8-bit samples (one 20 msec block) from each message channel in each of the six T1 links, and second, transforms the 160, 8-bit samples into 159 bit groups of compressed data. The 159 bit groups from each processing block (301-306) are serially transferred to a 6:1 compression circuit (310). The 6:1 compression circuit adds a single parity bit to each 159 bit group to form six different 160 bit groups. The 6:1 compression circuit then packs the six different 160 bit groups of data into one information block of 1280 bits. The 1280-bit block of data can be represented by a 20 msec, 160 frame information block. The input Programmable Logic Array (PLA), 6:1 expansion circuitry (312) performs the un-packing of the 160 frame information block of data coming from the base-site.

The 6:1 compression circuit is also responsible for adding error control and synchronization to the 160 frame information block. FIG. 4 depicts the hardware used and FIG. 5 illustrates the steps the 6:1 compression circuit undergoes to insert synchronization into the 160 frame information block. Referring to FIG. 4 and FIG. 5, the 6:1 compression circuit receives a 40 msec framing pulse (interrupt) to initialize counters modulo 40 (405) and modulo 80 (410), internal to the 6:1 compression circuit, to zero (501) and sets the frame synchronization bit to zero (504). The frame synchronization bit, referring to FIG. 2, is the most significant bit in a frame. Turning back to FIG. 4 and FIG. 5, a test is then made to see if a 125 μs pulse has been received (507). If no pulse has been received, the 6:1 compression circuit waits for one. If a pulse is received, internal modulos 40 (405) and 80 (410) are incremented (510). A test is done to determine if internal modulo 80 has reached a count of 80 (513). If modulo 80 has reached a count of 80, internal modulos 40 and 80 are reinitialized to zero. If the count of modulo 80 is less than 80, a test is done to determine if the count of modulo 40 is equal to 40 (519). If the count of modulo 40 is not equal to 40, a J-K flip-flop (415) will toggle the frame synchronization bit (522). If the count of modulo 40 equals 40, the frame synchronization bit will be set to a 1 (516). At this point, whenever a 125 μs pulse is received, the counters increment and toggle the synchronization bit. When modulo 80 counter reaches 80, both modulo 40 (405) and 80 (410) counters are set to zero, the synchronization bit is set to zero and the process is repeated. This means that of the 160 frames that are available, only 80 frames at a time are being used for synchronization.

FIG. 6 depicts the 160 frame information block that results from the 6:1 packing and synchronization. Frames one and 81 of every information block contain header bits which tell the receiving equipment which 160 bit group to look for. Again, the synchronization bit is the most significant bit of each frame. Frame one has as its synchronization bit a '0' and alternates in a '0' and '1' pattern until 40 frames have been counted. At frame 41, the pattern is reverses and a synchronization bit of '1' starts the alternating '1' and '0' pattern until frame 81 is reached. This process is repeated for the next 80 frames, thus two synchronizations occur in one 160 frame information block. Since the sampling rate per message channel on a T1 link is 125 μs, 160 frames of one message channel corresponds to 20 ms, thus, synchronization of the receiving equipment occurs every 80 frames or 10 ms.

Immediately after the header bits are placed in frame one, the 160 bit groups are inserted into the frames. The 160 bits are multiplexed into the 160 frame information block leaving every bit position next to a '0' synchronization bit un-used. This is required in special circumstances for T1 equipment to maintain synchronization. After each 160 bit group has been packed into the desired frames, error control in the form of a cyclic redundant check (CRC) is added. The CRC is an error correction code used to monitor the quality of transmission from the land-line telephone system interface to the base-site. Frames 80 and 160 contain a parity bit pattern to indicate to the receiving equipment when transmission of information for three message channels has been completed. The 160 frame information block shown in FIG. 6 is the block that a base-site will do processing on.

The 160 frame information block enters the base-site as shown in FIG. 3. The TDM interface (314) routes information contained in the TDM timeslot to a dedicated TDM timeslot processor (316). The TDM timeslot processor contains the hardware that decodes the synchronization pattern, checks each of the six 160 bit groups for transmission errors and separates the 160 bit groups. Each group is then coded and sent to the appropriate transmitter (318, 320) for RF transmission.

FIG. 8 illustrates the steps that the base-site goes through to perform synchronization decoding and message channel error detection to the 160 frame information block. 8-bit frames from the transmitted 160 frame information block are clocked into the base-site and the synchronization bit for each frame is stored (802). A test is then done to determine if two consecutive zeros are encountered in the synchronization bit position (804). If two consecutive zeroes (tcz) are encountered, a modulo 80 counter internal to the base-site is reset to zero (806), a tcz counter is incremented (808), the modulo 80 counter is incremented (810), and synchronization begins. If two consecutive zeros are not encountered, a test is done to determine if two consecutive ones (tco) are encountered (812). If two consecutive ones are encountered, a tco counter is incremented (814). After this step and incrementing of modulo 80 (810), modulo 80 is checked to determine if it is greater than or equal to 80 (832). If modulo 80 is equal to 80, tests are performed to determine if tco and tcz are equal to one (836 and 838 respectively). If both are equal to one, a loss of frame alignment flag is set to zero (844) and the internal synchronization bit is set to zero (846). If only one of tco and tcz is equal to zero, the loss of frame alignment is set to one (840), the tco and tcz counters are cleared (842) and the internal synchronization bit is reset to zero (846).

From above, if modulo 80 is not less than 80, a test is done to determine if modulo 80 is equal to 40 (816). If it is, the internal synchronization bit is set to one (818). If it is not, a check of the internal synchronization bit against the input synchronization bit is done (820). Input to this step is also after the internal synchronization bit is reset to zero (846) and the internal synchronization bit is set to one (818). If the input bit is the same as the internal bit, transmission was satisfactory and the entire process ends for that frame (822). If the input bit is not the same as the internal bit, a single bit error detection flag is set (824). After this is set, a test is done to determine if one of the three previous synchronization bits were in error (826). If that test is negative, a two out of four error flag is cleared (828) and the process ends for that frame (822). If the test is positive, the two out of four error flag is set (830) and again the process ends for that frame (822).

Figure 9:
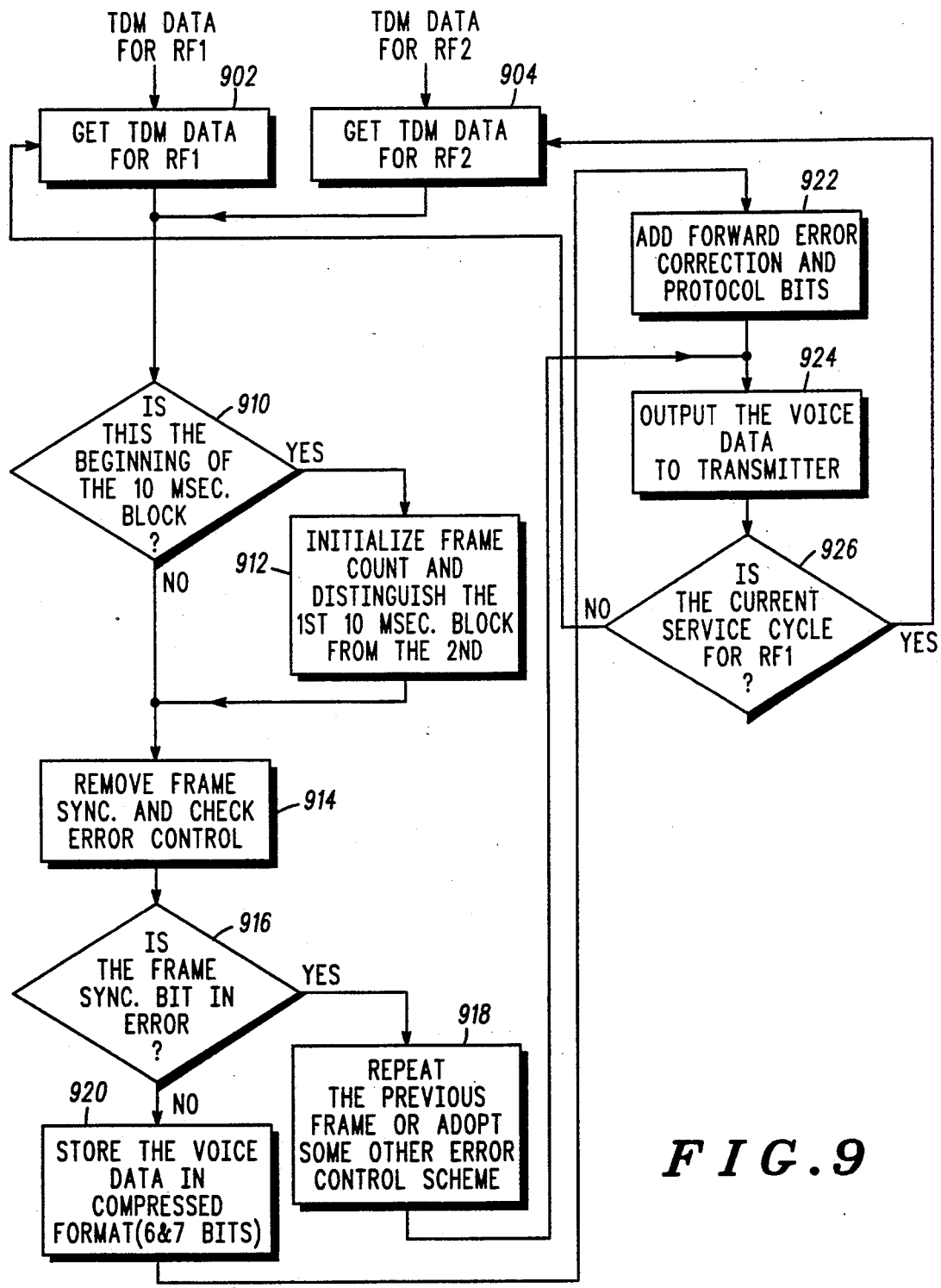
FIG. 9 is a flow diagram illustrating the steps a base-site performs to separate 160 bit groups for transmission.

Referring back to FIG. 1, the base-site (120) has now received the 160 frame information block of data from one TDM timeslot on a T1 link (115), decoded the synchronization pattern and checked each of the six 160 bit groups for errors. The base-site now separates and codes the six 160 bit groups as coded information for transmission over antennas RF1 (125) and RF2 (130) coupled to the base-site. This separating and coding of the six 160 bit groups disposed in the 160 frame information block is accomplished as follows. Referring to FIG. 9, the first 160 bit group in the 160 frame information block is designated for transmission over antenna RF1 (125 in FIG. 1). The 160 bit group is received from the 160 frame information block (902) and is checked to determine if it resides at the beginning of a 10 msec block (910). If the voice data is at the beginning, the frame count is initialized to zero and the first 10 msec block is distinguished from the second 10 msec block in the 160 frame information block (912). If the data does not reside at the beginning of a 10 msec block, synchronization is removed and error control checked (914). The synchronization bit is then checked for errors (916). If an error is encountered, the previous frame is sent to a transmitter or some other form of error control is employed (918). If an error is not encountered, the voice data is stored in compressed format (920), coded by adding forward error correction and protocol bits (922) and output to a transmitter (924). A test is then performed to determine if the current cycle is for antenna RF1 (926). If it is, data will be received for antenna RF2. If it is not, data will be received for antenna RF1.

Referring back to FIG. 1, after the first 160 bit group has been received from the 160 frame information block, and forward error correction, synchronization and signalling protocol bits added, the information timeslot is transmitted on a first RF carrier out antenna RF1 (125). This first information timeslot corresponds to information timeslot A (135). The process is then repeated for a second 160 bit group in the 160 frame information block. This second 160 bit group gets stored in compressed format, has forward error correction, synchronization and signalling protocol bits added and is transmitted on a second RF carrier out antenna RF2 (130). This second information timeslot corresponds to information timeslot B (138). The process is repeated with a third 160 bit group being output over antenna RF1 (125) in information timeslot C (136). When the process has been completed for all six 160 bit groups, the process is repeated on another 160 frame information block received by the base-site.

Thus, needs have been substantially met through the RF cellular communication system employing at least 2:1 compression summarized below. The invention comprises information input from at least two message channels input into a land-line telephone system interface wherein each message channel is further comprised of one 8-bit timeslot at a transmission rate of 64 Kbit/s. The land-line telephone system interface obtains 160 samples of 8-bit timeslots from each message channel and transforms the 160 samples into at least a first 160 bit group and a second 160 bit group. The at least first 160 bit group and second 160 bit group are then packed into a 1280-bit information block represented by 160 frames of 8-bit TDM timeslots.

Each 160 bit group packed into the 160 frame information block has error control for transmission quality monitoring added while the entire 160 frame information block has a synchronization pattern inserted. The synchronization pattern is an alternating '0' and '1' pattern in the most significant bit of each frame. Frame 1 starts with a '0' and alternates up to frame 41, where a '1' is inserted in the synchronization bit position. The pattern then alternates up to frame 80 and the process is repeated for the next 80 frames. Synchronization occurs when two consecutive 0's are encountered, which is at frames 80/81 and frames 160/1 of the next 160 frame information block.

The 160 frame information block is then conveyed from the land-line telephone system interface to a base-site, one TDM timeslot at a time. The base-site receives the 160 frame information block, synchronizes every 80 frames and checks each 160 bit group for transmission errors. The at least first 160 bit group and the second 160 bit group are then separated and coded to the proper format for transmission. The coded at least first 160 bit group further comprises a first 324 bit group and the coded second 160 bit group further comprises a second 324 bit group. The first 324 bit group is transferred into a first information timeslot for radio transmission on a first radio carrier frequency and the second 324 bit group is transferred into a second information timeslot for radio transmission on a second radio carrier frequency.

What we claim is:

1. A digital radio time-division multiple access (TDMA) system including a land-line telephone system interface and at least one base-site which generates at least one radio carrier frequency, the digital radio time-division multiple access (TDMA) system utilizing an equipment synchronization scheme to maintain equipment synchronization when required, the digital radio time-division multiple access (TDMA) system comprising:

means for compressing information input from at least two message channels from the land-line telephone system into one information block for transmission in one TDM timeslot;

means for inserting a block synchronization scheme into said one information block;

means for reserving a portion of said information block for the equipment synchronization scheme;

means for using a fraction of said reserved portion for said compressed information when equipment synchronization is not required;

means for conveying at least said one TDM timeslot from the land-line telephone system interface to a base-site; and means, coupled to said means for conveying, for converting said compressed information of at least said one TDM timeslot to coded information for at least two information timeslots for radio transmission on a radio carrier frequency.

2. The digital radio TDMA system of claim 1 wherein said means for conveying said one TDM timeslot is at a rate of 64 Kbit/s.

3. The digital radio TDMA system of claim 1 wherein said means for compressing further comprises means for compressing information input from six message channels into one information block for transmission in one TDM timeslot.

4. The digital radio TDMA system of claim 3 wherein at least one of said six message channels in one 8-bit timeslot from one of six T1 carriers.

5. The digital radio TDMA system of claim 4 wherein said one 8-bit timeslot from one of six T1 carriers is transferred at a rate of 64 Kbit/s.

6. The digital radio TDMA system of claim 4 wherein said means for compressing further comprises first means for obtaining one hundred and sixty 8-bit samples from one of six T1 carriers and second means for obtaining one hundred and sixty 8-bit samples from a second of said six T1 carriers.

7. The digital radio TDMA system of claim 6 wherein said means for compressing further comprises first means for transforming said one hundred and sixty 8-bit samples into a first 160 bit group and second means for transforming said one hundred and sixty 8-bit samples into a second 160 bit group.

8. The digital radio TDMA system of claim 7 wherein said means for compressing further comprises means for packing at least said first 160 bit group and said second 160 bit group into a 1280-bit information block.

9. The digital radio TDMA system of claim 8 wherein said 1280-bit information block is one 160 frame information block of 8-bit timeslots.

10. The digital radio TDMA system of claim 9 wherein said means for compressing further comprises means for adding error control to said one 160 frame information block for each of said packed first 160 bit group and second 160 bit group.

11. The digital radio TDMA system of claim 10 wherein said error control further comprises a cyclic redundancy check (CRC) code.

12. The digital radio TDMA system of claim 11 wherein said CRC code is comprised of 6 bits.

13. The digital radio TDMA system of claim 10 wherein said means for inserting a block synchronization scheme in said one 160 frame information block further comprises means for inserting a bit having a value of '0' into the most significant bit position of frame 1 and inserting bits having alternating values of '1' and '0' into the most significant bit positions for the subsequent 39 frames, a bit having a value of '1' into the most significant bit position of frame 41 and inserting bits having alternating values of '0' and '1' into the most significant bit positions for the subsequent 39 frames, a bit having a value of '0' into the most significant bit position of frame 81 and inserting bits having alternating values of '0' and '0' into the most significant bit positions for the subsequent 39 frames, and a bit having a value of '1' into the most significant bit position of frame 121 and inserting bits having alternating values of '0' and '1' into the most significant bit positions for the subsequent 39 frames.

14. The digital radio TDMA system of claim 10 wherein said synchronization repeats every 80 frames.

15. The digital radio TDMA system of claim 10 wherein said synchronization repeats every 10 msec.

16. The digital radio TDMA system of claim 1 wherein said means for converting further comprises means for receiving said at least one TDM timeslot.

17. The digital radio TDMA system of claim 16 wherein said at least one TDM timeslot further comprises one information block of 160 frames.

18. The digital radio TDMA system of claim 17 wherein said means for converting further comprises means for synchronizing to said one 160 frame information block.

19. The digital radio TDMA system of claim 17 wherein said means for converting further comprises means for checking error control disposed in said one 160 frame information block for each of said multiplexed at least first 160 bit group and second 160 bit group.

20. The digital radio TDMA system of claim 19 wherein said means for converting further comprises means for separating multiplexed first 160 bit group and second 160 bit group disposed in said 160 frame information block.

21. The digital radio TDMA system of claim 20 wherein said means for converting further comprises means for coding each of said separated first 160 bit group and said separated second 160 bit group.

22. The digital radio TDMA system of claim 21 wherein said coded first 160 bit group further comprises a first 324 bit group and said coded second 160 bit group further comprises a second 324 bit group.

23. The digital radio TDMA system of claim 22 wherein said means for converting further comprises means for packing said first 324 bit group into a first information timeslot for radio transmission on a first radio carrier frequency and said second 324 bit group into a second information timeslot for radio transmission on a second radio carrier frequency.

24. A digital radio time-division multiple access (TDMA) system including a land-line telephone system interface and at least one base-site which receives at least one radio carrier frequency, the digital radio time-division multiple access (TDMA) system utilizing an equipment synchronization scheme to maintain equipment synchronization when required, the digital radio time-division multiple access (TDMA) system comprising:

means for converting coded information of at least two information timeslots received from radio transmission on a radio carrier frequency into one information block for transmission in one TDM timeslot, for reserving a portion of said information block for the equipment synchronization scheme, and for using a fraction of said reserved portion for said compressed information when equipment synchronization is not required, coupled to;

means for conveying at least said one TDM timeslot from a base-site to the land-line telephone system interface;

means, coupled to said means for conveying, for synchronizing to said one information block transmitted in at least said one TDM timeslot; and means, coupled to said means for conveying, for expanding said compressed information of at least said one TDM timeslot.

25. A method which transfers messages from a land-line telephone system interface to at least one base-site in a digital radio time-division multiple access (TDMA) system, the digital radio time-division multiple access (TDMA) system utilizing an equipment synchronization scheme to maintain equipment synchronization when required, the digital radio time-division multiple access (TDMA) system, the method comprising the steps of:

compressing information input from at least two message channels from a land-line telephone system into one information block for transmission in one TDM timeslot;

inserting a block synchronization scheme into said one information block;

reserving a portion of said information block for the equipment synchronization scheme;

using a fraction of said reserved portion for said compressed information when equipment synchronization is not required;

conveying at least said one TDM timeslot from the land-line telephone system interface to a base-site; and converting said compressed information of said one TDM timeslot, conveyed from said land-line telephone system interface, to coded information for at least two information timeslots for radio transmission on a radio carrier frequency.

26. The method of claim 25 wherein said step of conveying said one TDM timeslot is at a rate of 64 Kbit/s.

27. The method of claim 25 wherein said step of compressing further comprises the step of compressing information input from six message channels into one information block for transmission in one TDM timeslot.

28. The method of claim 27 wherein said at least one of six message channels is one 8-bit timeslot from one of six T1 carriers, and wherein said one 8-bit timeslot from one of six T1 carriers is transferred at a rate of 64 Kbit/s, said step of compressing further comprises the step of obtaining one hundred and sixty 8-bit samples from one of six T1 carriers and obtaining one hundred and sixty 8-bit samples from a second of said six T1 carriers.

29. The method of claim 28 wherein said step of compressing further comprises the step of transforming said one hundred and sixty 8-bit samples into a first 160 bit group and transforming said one hundred and sixty 8-bit samples into a second 160 bit group.

30. The method of claim 29 wherein said step of compressing further comprises the step of packing at least said first 160 bit group and said second 160 bit group into a 1280-bit information block.

31. The method of claim 30 wherein said 1280-bit information block is one 160 frame information block of 8-bit timeslots, said step of compressing further comprises adding error control to said one 160 frame information block for each of said packed first 160 bit group and second 160 bit group.

32. The method of claim 31 wherein said step of adding error control further comprises the step of generating a cyclic redundancy check (CRC) code and wherein said CRC code further comprises 6 bits.

33. The method of claim 31 wherein said step of inserting a block synchronization scheme in said one 160 frame information block further comprises the step of inserting a bit having a value of '0' into the most significant bit position of frame 1 and inserting bits having alternating values of '1' and '0' into the most significant bit positions for the subsequent 39 frames, a bit having a value of '1' into the most significant bit position of frame 41 and inserting bits having alternating values of '0' and '1' into the most significant bit positions for the subsequent 39 frames, a bit having a value of '0' into the most significant bit position of frame 81 and inserting bits having alternating values of '1' and '0' into the most significant bit positions for the subsequent 39 frames, and a bit having a value of '1' into the most significant bit position of frame 121 and inserting bits having alternating values of '0' and '1' into the most significant bit positions for the subsequent 39 frames, wherein said inserted synchronization repeats every 80 frames and wherein said inserted synchronization repeats every 10 msec.

34. The method of claim 25 wherein said step of converting further comprises the step of receiving said at least one TDM timeslot.

35. The method of claim 34 wherein said at least one TDM timeslot further comprises one information block of 160 frames and wherein said step of converting further comprises the step of synchronizing to said one 160 frame information block.

36. The method of claim 35 wherein said step of converting further comprises the step of checking error control disposed in said one 160 frame information block for each of said multiplexed at least first 160 bit group and second 160 bit group.

37. The method of claim 36 wherein said step of converting further comprises the step of separating multiplexed first 160 bit group and second 160 bit group disposed in said 160 frame information block.

38. The method of claim 37 wherein said step of converting further comprises the step of coding each of said separated first 160 bit group and said second 160 bit group.

39. The method of claim 38 wherein said coded first 160 bit group further comprises a first 324 bit group and said coded second 160 bit group further comprises a second 324 bit group and wherein said step of converting further comprises the step of packing said first 324 bit group into a first information timeslot for radio transmission on a first radio carrier frequency and said second 324 bit group into a second information timeslot for radio transmission on a second radio carrier frequency.

40. A method which transfers messages from a land-line telephone system interface to at least one base-site in a digital radio time-division multiple access (TDMA) system comprising the steps of:

converting coded information of at least two information timeslots received from radio transmission on a radio carrier frequency into one information block for transmission in one TDM timeslot;

conveying at least said one TDM timeslot from a base-site to the land-line telephone system interface;

synchronizing to said one information block transmitted in at least said one TDM timeslot conveyed from a base-site; and expanding said compressed information of said TDM timeslot of conveyed from a base-site.

* * * * *

UNITED STATES PATENT AND TRADEMARK OFFICE
CERTIFICATE OF CORRECTION

PATENT NO. : 5,111,454
DATED : May 5, 1992
INVENTOR(S) : Nelson C. Hung, John R. Welk It is certified that error appears in the above-identified patent and that said Letters Patent is hereby corrected as shown below:

In The Abstract:

Line 7, delete the phrase "messages" and substitute therefor --message--.

Column 7,

In claim 13, line 47, please delete "of '0'" and substitute therefor -- of '1'--.

Signed and Sealed this

Twenty-ninth Day of June, 1993

Attest:

MICHAEL K. KIRK

Attesting Officer

Acting Commissioner of Patents and Trademarks